United States Patent [19]

Engler et al.

[11] Patent Number: 4,963,521

[45] Date of Patent: Oct. 16, 1990

[54] EXHAUST-GAS CATALYST WITH REDUCED TENDENCY TO STORE SULFUR OXIDES AND TO EMIT HYDROGEN SULFIDE AND PROCESS FOR PREPARING THE CATALYST

[75] Inventors: Bernd Engler, Hanau; Edgar Koberstein, Alzenau; Egbert Lox, Hanau, all of Fed. Rep. of Germany

[73] Assignee: Degussa Aktiengesellschaft, Frankfurt, Fed. Rep. of Germany

[21] Appl. No.: 345,721

[22] Filed: May 1, 1989

[30] Foreign Application Priority Data

Sep. 7, 1988 [DE] Fed. Rep. of Germany ....... 3830318

[51] Int. Cl.$^5$ .................. B01J 21/02; B01J 21/04; B01J 23/10; B01J 23/40
[52] U.S. Cl. ................................. 502/207; 423/213.5
[58] Field of Search .............................. 502/207, 304; 423/213.5

[56] References Cited

U.S. PATENT DOCUMENTS

| | | | |
|---|---|---|---|
| 4,120,821 | 10/1978 | Iizuka et al. ..................... | 502/207 |
| 4,233,183 | 11/1980 | Inaba et al. ..................... | 502/207 X |
| 4,237,030 | 12/1980 | Noguchi et al. ................. | 502/207 |
| 4,294,726 | 10/1981 | Bozon et al. ..................... | 252/462 |
| 4,581,343 | 4/1986 | Blanchard et al. .............. | 502/241 |

*Primary Examiner*—W. J. Shine
*Attorney, Agent, or Firm*—Beveridge, DeGrandi & Weilacher

[57] ABSTRACT

A catalyst for purifying the exhaust gases of internal combustion engines by means of oxidation and reduction with a reduced tendency to store sulfur oxides and to emit $H_2S$ contains active $Al_2O_3$ as carrier which is charged with $CeO_2$ and optionally with $ZrO_2$ as well as with platinum, and/or palladium, and optionally rhodium and also contains in addition 0.7 to 20% by weight $B_2O_3$ relative to $Al_2O_3$.

12 Claims, 3 Drawing Sheets

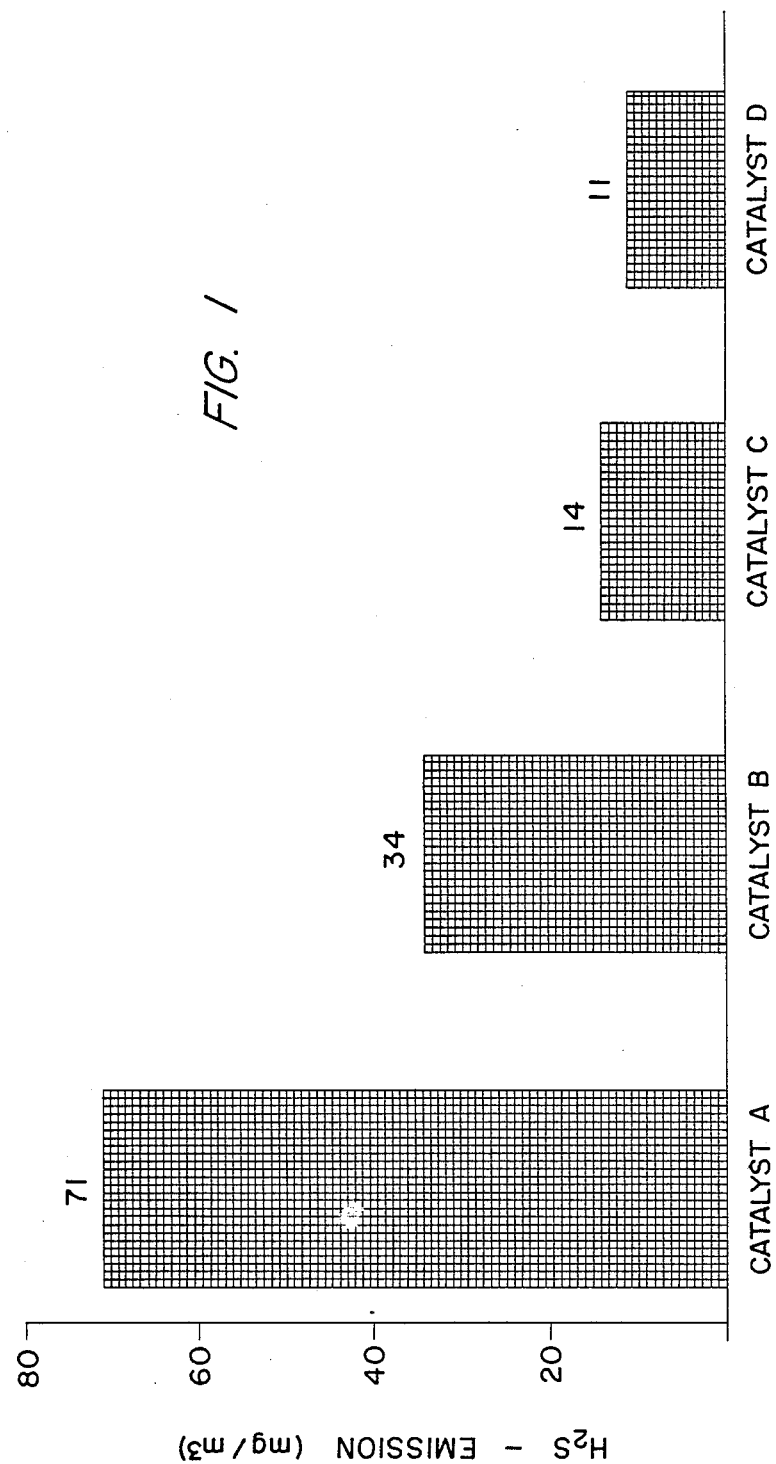

EXHAUST-GAS CATALYST WITH REDUCED TENDENCY TO STORE SULFUR OXIDES AND TO EMIT HYDROGEN SULFIDE AND PROCESS FOR PREPARING THE CATALYST

INTRODUCTION AND BACKGROUND

The invention relates to a catalyst for the purification of exhaust gases of internal combustion engines by means of oxidation and/or reduction. The catalysts can contain the platinum group metals; namely, platinum, palladium and rhodium individually or in combination. They can be used, depending on the composition, as reduction catalyst of a double-bed reactor (in this instance the exhaust gas is first conducted to a reduction catalyst and then after admixture of air is conveyed to an oxidation catalyst) or as multifunctional catalyst for the simultaneous conversion of the oxidizable and the reducible components of the exhaust gas.

Engine exhaust-gas catalysts, especially those with high cerium oxide content, can bind sulfur oxides under oxidizing exhaust-gas conditions. With the change to reducing exhaust gases during travel, the amounts of sulfur oxide bound to the catalysts in this manner can be partially released again as hydrogen sulfide which is highly undesirable.

Since engine exhaust gases can contain sulfur dioxide as a result of using fuels containing sulfur and because the exhaust-gas catalyst experiences both oxidizing as well as reducing conditions in operation, depending on the engine operating conditions, hydrogen sulfide can be emitted when using traditional auto exhaust-gas catalysts. The $H_2S$ odor threshold can be briefly exceeded thereby in a noticeable fashion.

It has been known for sometime that catalysts containing nickel exhibit only very low hydrogen sulfide emissions; however, the use of nickel as a component in engine exhaust-gas catalysts is problematic because of its suspected carcinogenic action. It should therefore basically be avoided.

There is, therefore, a need based on environmental reasons for nickel-free engine exhaust-gas catalysts with a reduced tendency to emit hydrogen sulfide.

The present invention starts essentially with the general teaching of DE patent No. 29 07 106 (to which U.S. Pat. No. 4,294,726 corresponds) for the formulation of exhaust-gas purification catalysts and expands this teaching as concerns the potential elements of the oxide layer and their combinations by a new component with which it is possible to eliminate the above-mentioned deficiency to a large extent.

SUMMARY OF THE INVENTION

The subject matter of the present invention resides in a catalyst for the purification of the exhaust gases of internal combustion engines with aluminum oxide of the transition series i.e., transition aluminas, as carrier which contains 2 to 70% by weight $CeO_2$ and 0 to 20% by weight $ZrO_2$ and with an active noble metal phase consisting of 0.01 to 3% by weight platinum, and/or palladium and optionally rhodium applied to the carrier, with a weight ratio between platinum and/or palladium and the optionally present rhodium of 2:1 to 30:1. The catalyst is obtainable by impregnating the optionally lattice-stabilized carrier with an aqueous solution of cerium salt and, optionally, zirconium salt or by mixing the optionally lattice-stabilized carrier with an aqueous suspension of their oxides, hydroxides or carbonates and by a subsequent tempering in air at 500° to 900° C. Subsequently, the carrier is impregnated with an aqueous solution of a salt of the noble metal component, dried and treated, optionally in a current of gas containing hydrogen at temperatures of 250° to 650° C., whereby the catalyst is present, as described in Example 3 below optionally in the form of a coating, on a honeycombed, inert carrier substrate of ceramics or metal or on a foamed ceramic carrier substrate in an amount of 5 to 30% by weight relative to the weight of the carrier substrate.

The catalyst is characterized in that it contains 0.2 to 25% by weight, preferably 0.7 to 20% by weight $B_2O_3$ relative to $Al_2O_3$. This $B_2O_3$ content is obtainable by impregnating the $Al_2O_3$ or the $Al_2O_3$ containing $CeO_2$, and optionally $ZrO_2$, before or after the application of the noble metal component, or optionally also together with the latter, with a dissolved or dispersed compound containing boron. Thereafter, drying and thermally activating follow, optionally under hydrothermal conditions, namely when the boron compound is added together with the noble metal component or after the addition of the same, at temperatures of 150° to 900° C. if the noble metal component is applied after, and at temperatures of 150° to 650° C. if the noble metal component is applied before or together with the boron compound.

The action of the catalyst of the invention can be differentiated in that it also contains one or more of the compounds $Fe_2O_3$, $CaO$, $BaO$, $La_2O_3$ and or other rare earth metal oxides in a range of 0.5 to 20% by weight in addition to the $CeO_2$ and the optional $ZrO_2$ as components which modify the carrier material. Among others, naturally occurring oxide mixtures of rare earths can be used.

The catalyst can be present, as stated above, in the form of a coating on a honeycombed body consisting of inert ceramics or metal or as bulk material catalyst; e.g. as pellets, rings, tablets, small balls or as honeycombed, monolithic solid extrudate (in which the honeycombed monolith consists completely of the catalytic composition) or as foamed ceramics.

Further, the invention relates to the use of the catalyst as oxidation and/or reduction catalyst for purifying the exhaust gases of internal combustion engines with diminution or decrease of the storage of sulfur dioxides and of the emission of hydrogen sulfide.

The doping of the carrier component with $CeO_2$ and e.g. $ZrO_2$ as well as the application of the active noble metal component takes place essentially in accordance with the measures described in DE patent No. 29 07 106 which is incorporated herein by reference. The doping with $B_2O_3$ can take place in a simple manner with boric acid which is impregnated or added either as aqueous solution or as dispersion in a liquid which does not dissolve boric acid into the carrier material, which is charged with $CeO_2$ and/or the other doping materials or is still free of them, or which is added to the doping solution, e.g. also as a solid. A separate or simultaneous application in conjunction with the application of the noble metal is also possible in a corresponding manner. In the latter instance an activation under hydrothermal conditions, e.g. in a current of water vapor or in a current of nitrogen containing water vapor can be used. The doping can also take place by means of adding $B_2O_3$ powder to the carrier material or by the use of a suspension of a boron compound which is insoluble in water, e.g. boron phosphorus oxide (BPO$_4$), whereby the addition can take place before or together with the other doping materials. The temperature of the activation employed here is maintained rather low, that is, the provided upper end temperature should not be exceeded here for the activation of the noble metal component.

The carrier material, e.g. $\gamma$-aluminum oxide and/or another crystal phase from the transitional field to (but not including) $\gamma$-aluminum oxide, can be lattice-stabilized by means of impregnation with solutions of salts of the alkaline-earth metals, of zirconium and of elements of the rare earth series as well as silicon-containing compounds and followed by heating about 4 to 12 hours. Instead of impregnation, a coprecipitation of salts of aluminum and of the stabilizer precursor can take place.

According to the selection of the catalytic composition, there can be provided a reducing, or a successively oxidizing and reducing, or a simultaneously oxidizing and reducing exhaust-gas purification system. Reduction catalysts preferably contain platinum and rhodium as active phase, double-bed systems include a first catalyst containing platinum and rhodium and a second catalyst containing platinum, platinum/palladium, platinum/rhodium or platinum/palladium/rhodium; multi-functional catalysts preferably contain platinum/rhodium or platinum/palladium/rhodium.

The invention is described in more detail in the following examples of embodiments and with reference made to the drawings.

BRIEF DESCRIPTION OF THE DRAWINGS

FIG. 1 shows H$_2$S emissions (mg/m$^3$) for catalyst A (without boron) and catalysts B, C and D (boron addition diminishes H$_2$S emissions).

EXAMPLE 1

Figure 2A:
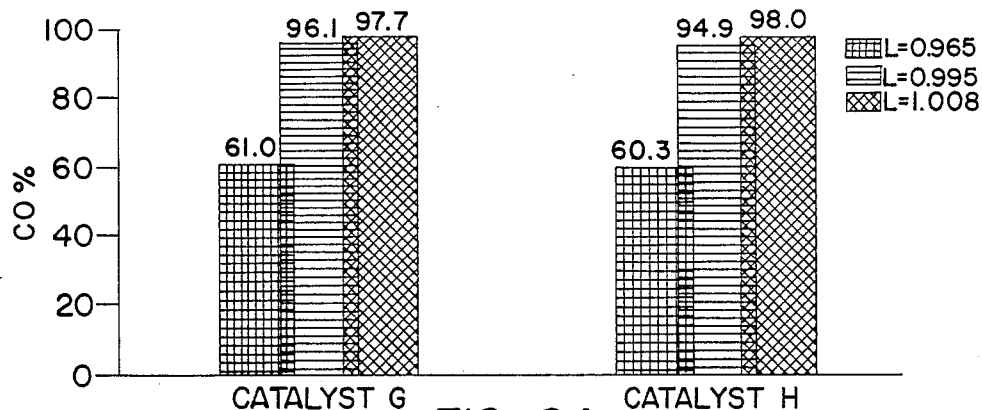
FIGS. 2A, 2B and 2C show evaluation of catalysts G and H (fresh in an engine dynamometer for three-way activity, conversion vs lambda dynamic conditions (1 Hz±0.5 A/F 400° C.).

Four three-way catalysts of the pellet type were produced in the same manner and provided with the same content of noble metal, oxygen-storing (CeO$_2$) component and carrier stabilizer. $\gamma$-aluminum oxide was used as carrier material, which was provided with 0.6% by weight zirconium dioxide and with 7.6% by weight CeO$_2$ relative to the amount of aluminum oxide. The noble-metal charge was 0.029% by weight Pt, 0.087% by weight Pd and 0.007% by weight Rh relative in each instance to the amount of aluminum oxide. (Weight ratio of Pt:Pd:Rh=4:12:1).

The production of the catalysts took place in two essential stages. In the first stage, $\gamma$-Al$_2$O$_3$ pellets with an average diameter of 3 mm and a specific surface of 120 m$^2$/g were impregnated with a solution of the necessary amount of cerium nitrate and zirconium nitrate, dried at 120° C. and calcined at 600° C. in air. In the second stage, the pellets were impregnated with the noble metal component, dried at 120° C. and calcined again at 600° C. Catalyst A resulted.

The second catalyst, designated as catalyst B, was produced in the same manner but with the exception that boric acid (H$_3$BO$_3$) was added to the solution for initial compounds of the two precursors of cerium and zirconium in such an amount that the finished catalyst exhibited a boron content of 1.3% by weight calculated as B$_2$O$_3$.

The third catalyst, designated as catalyst C, was produced in the same manner as catalyst B but with the exception that the finished catalyst contained 3.1% by weight B$_2$O$_3$.

The fourth catalyst, designated as catalyst D, was prepared in the same manner as catalyst B but with the exception that the boron content of the finished catalyst was 6.3% by weight, calculated as B$_2$O$_3$.

EXAMPLE 2

The hydrogen sulfide emissions of the four catalysts A, B, C and D produced according to Example 1 were determined in a two-stage method in a synthesis-gas reactor. The first stage was carried out under the following test conditions:
Temperature: 450° C.
Space velocity: 66,000 l exhaust gas volume/h/l catalyst volume
Duration: 1 hour
Gas composition: lean: $\lambda=1.004$
  CO: 1.0% by vol.
  C$_3$H$_6$: 0.033% by vol.
  C$_3$H$_8$: 0.017% by vol.
  NO: 0.10% by vol.
  O$_2$: 1.05% by vol.
  SO$_2$: 20 ppm by vol.
  CO$_2$: 14% by vol.
  H$_2$O: 10% by vol.
  H$_2$: 0.33% by vol.
  N$_2$: remainder.

At the end of the first test stage the gas composition was switched to "rich" ($\lambda=0.92$) at the same temperature and space velocity. The exhaust gases were collected during the first two minutes after the switch and the average hydrogen sulfide content determined.

The gas composition in the second stage was:
  CO: 2.1% by vol.
  C$_3$H$_6$: 0.033% by vol.
  C$_3$H$_8$: 0.017% by vol.
  NO: 0.10% by vol.
  O$_2$: 0.25% by vol.
  SO$_2$: 20 ppm by vol.
  CO$_2$: 14% by vol.
  H$_2$O: 10% by vol.
  H$_2$: 0.71% by vol.
  N$_2$: remainder.

The results of this determination of hydrogen sulfide for catalysts A, B, C and D are shown in FIG. I. It is clearly apparent that the addition of boron diminishes the emission of H$_2$S considerably.

EXAMPLE 3

Two other catalysts designated as catalyst E and catalyst F were produced using a ceramic honeycombed body of cordierite.

The production took place in two stages. In the first stage, $\gamma$-Al$_2$O$_3$ in powder form was charged with 3.0% by weight ZrO$_2$ and 60.0% by weight cerium dioxide by impregnation with solution of zirconium and cerium acetate; the Al$_2$O$_3$ doped in this manner was brought into the form of an aqueous dispersion containing 30% by weight solid matter and the ceramic honeycomb was coated with this dispersion. The coated honeycomb was then charged in a known manner by impregnation with salt solutions of platinum (platinum nitrate), rhodium (rhodium chloride) and palladium (palladium nitrate) so that a noble-metal charge consisting of 0.436% by weight platinum, 0.635% by weight palladium and 0.194% by weight rhodium was present relative in each instance to the amount of aluminum oxide. (Catalyst E).

Catalyst F was prepared in the same manner as catalyst E with the exception that boric acid was added to the first production stage in such an amount that the finished catalyst exhibited a boron content (relative to $Al_2O_3$) of 17% by weight calculated as $B_2O_3$.

EXAMPLE 4

Catalysts E and F described in Example 3 were tested for hydrogen sulfide emission according to the method of Example 2. The hydrogen sulfide emission for catalyst E was 202 mg/m$^3$ whereas that of catalyst F was only 80 mg/m$^3$.

EXAMPLE 5

Five other three-way catalysts in pellet form (catalysts G, H, I, J, K) were produced according to the method described in Example 1. The total noble-metal content was 0.1736% by weight relative to the amount of aluminum oxide. The weight ratio between the noble metals was Pt:Pd:Rh=8:3.2:1 for all catalysts. The catalysts contained 7.6% by weight $CeO_2$ and 0.6% by weight $ZrO_2$ relative in each instance to the amount of aluminum oxide.

Catalyst G was produced without further additives.

Catalyst H was produced in the same way as catalyst G with the exception that boric acid was added in the first production stage to the solution of cerium and zirconium acetate. The amount of boric acid added was measured so that finished catalyst H contained 3.4% by weight $B_2O_3$ relative to the amount of aluminum oxide.

Catalyst I was also produced like catalyst G with the exception that boric acid was added to the solution of noble-metal salts used in the second production stage. The amount of boric acid added was measured so that finished catalyst I contained 0.7% by weight $B_2O_3$.

Catalyst J was produced by impregnating catalyst G with an aqueous solution of boric acid in such a manner that finished catalyst J contained 1.36% by weight $B_2O_3$ relative to the amount of aluminum oxide.

Catalyst K was produced like catalyst H with the exception that instead of boric acid, an aqueous suspension of boron phosphorus oxide (BPO$_4$) was used. Catalyst K contained 0.68% by weight $B_2O_3$ and 1.37% by weight $P_2O_5$ relative to the amount of aluminum oxide.

The hydrogen sulfide emissions of catalyst G, H, I, J and K were measured according to Example 2 and were 100 mg/m$^3$ for catalyst G, 40 mg/m$^3$ for catalyst H, 31 mg/m$^3$ for catalyst I, 44 mg/m$^3$ for catalyst J and 6 mg/m$^3$ for catalyst K.

It follows from the above that a favorable influence on the diminution of the H$_2$S emission can always be achieved in comparison to the corresponding boron-free catalysts which influence is independent of the manner in which the boron is introduced, that is, it is independent of whether a boron compound soluble in water (such as boric acid) or an aqueous suspension of an insoluble boron compound (such as boron phosphorus oxide) is used or whether the boron is added in a separate production step or together with the base metal precursors or with the noble metal component.

EXAMPLE 6

Figure 2B:
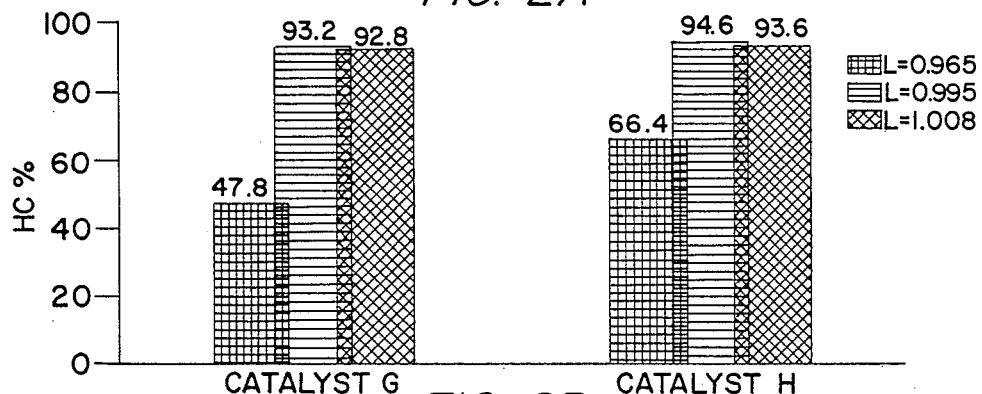
Figure 2C:
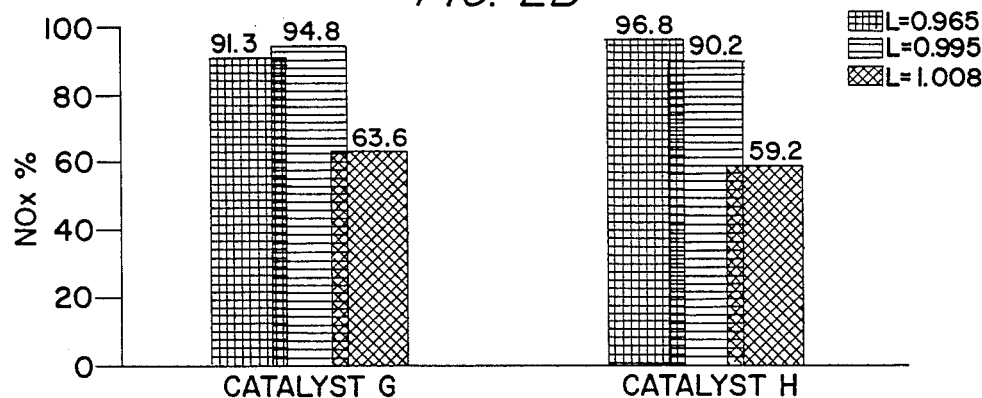

In order to assure that the addition of boric acid does not result in an impairment of the catalytic activity, catalysts G and H described in Example 5 were evaluated in an engine dynamometer for three-way activity. The results are shown in FIGS. 2A, 2B and 2C. These figures clearly show that the addition of boric acid in no manner impairs the catalytic action.

EXAMPLE 7

Figure 3A:
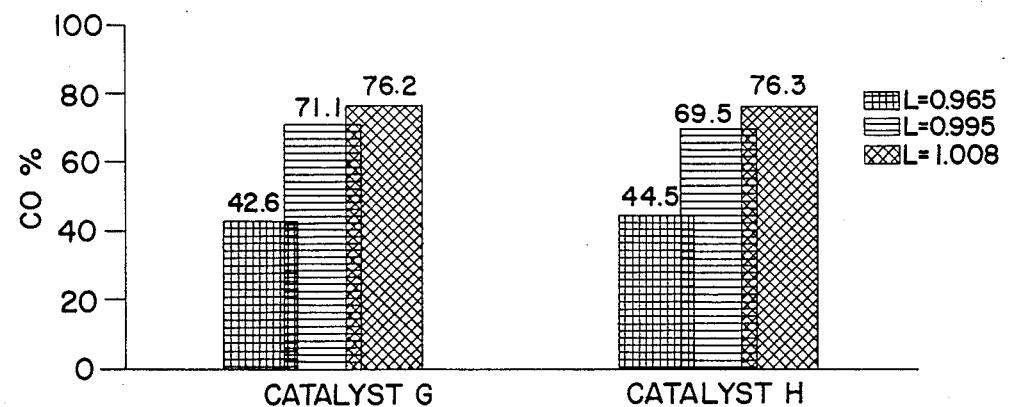
FIGS. 3A, 3B and 3C show evaluation of catalyst G and H after 100 hours of motor ageing, conversion vs. lambda dynamic conditions (1 Hz±0.5 A/F 400° C.).
Figure 3B:
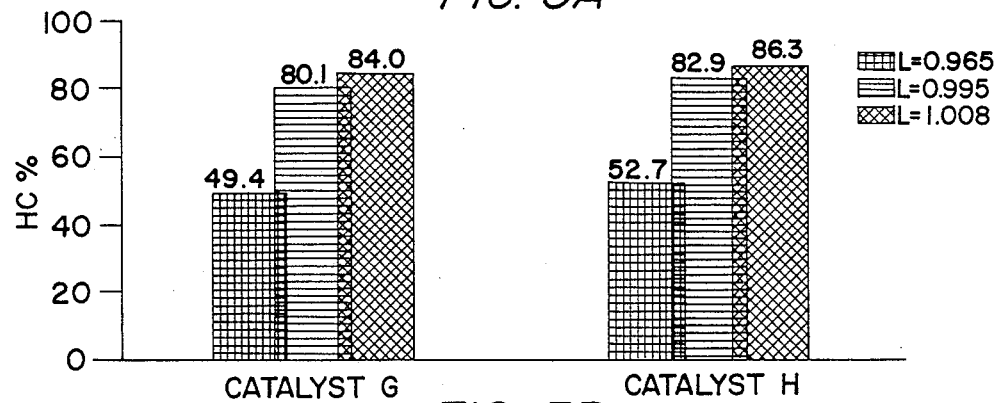
Figure 3C:
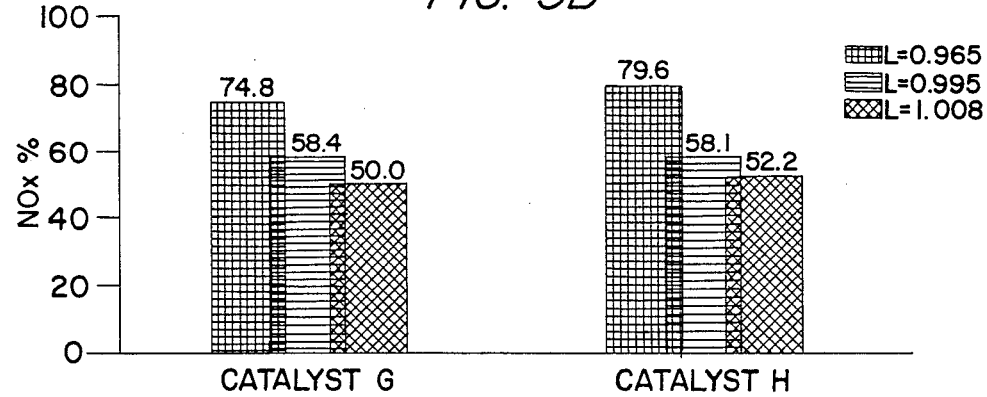

In order to assure that the addition of boric acid does not result in an accelerated ageing of the catalyst, catalysts G and H described in Example 5 were aged 100 hours at 850° C. and λ=0.995 in an engine dynamometer. The three-way activity of the aged catalysts was then evaluated. The results are shown in FIGS. 3A, 3B and 3C. These figures clearly show that the addition of boric acid does not result in an accelerated ageing of the catalyst.

EXAMPLE 8

In order to demonstrate that the addition of boron compound results in a diminution of the storage of sulfur oxides, it was determined how much SO$_2$ is stored at 60° C. by catalysts G and H of Example 5. One gram of catalyst G absorbs e.g. 17.8 ml SO$_2$ and one g of catalyst H absorbs only 10.8 ml SO$_2$, which clearly shows that the co-usage of boron in the three-way catalysts results in a diminution of sulfur oxide storage and therefore in a diminution of the H$_2$S emissions.

We claim:

1. A catalyst for purification of exhaust gases of internal combustion engines comprising a carrier of a transition aluminum oxide containing 2 to 70% by weight CeO$_2$ 0 to 20% by weight ZrO$_2$, an active noble metal component phase consisting of 0.01 to 3% by weight platinum and/or palladium, and optionally rhodium, with a weight ratio between platinum and/or palladium and the optional rhodium of 2:1 to 30:1, and 0.2 to 25% by weight B$_2$O$_3$ relative to Al$_2$O$_3$.

2. A catalyst according to claim 1, wherein B$_2$O$_3$ is 0.7 to 20% by weight relative to Al$_2$O$_3$.

3. The catalyst according to claim 2, wherein one or more of the compounds Fe$_2$O$_3$, BaO, CaO, La$_2$O$_3$ and other rare earth metal oxides in a range of 0.5 to 20% by weight are added in addition to the CeO$_2$ and the optional ZrO$_2$ as components which modify the carrier material.

4. The catalyst according to claim 1, wherein the carrier material is present as bulk material in the form of small balls, rings, extrudates or tablets or as extruded honeycombed body.

5. The catalyst according to claim 3, wherein the carrier material is present as bulk material in the form of small balls, rings, extrudates or tablets or as extruded honeycombed body.

6. An oxidation and/or reduction catalyst for purifying the exhaust gases of internal combustion engines with diminution of the storage of sulfur oxides and of the emission of hydrogen sulfide comprising a catalyst according to claim 1.

7. A process for preparation of a catalyst of claim 1, comprising the steps of impregnating a carrier of aluminum oxide with an aqueous solution of cerium salt and optionally zirconium salt and a dispersed or dissolved compound containing boron followed by tempering at 150° to 900° C.;

followed by the impregnation with an aqueous solution of a salt of the noble metal component; and thereafter drying and thermally activating the catalyst at 150°–900° C.

8. A process for preparation of a catalyst of claim 1 comprising steps of impregnating a carrier of a transition aluminum oxide with an aqueous solution of a cerium salt and optionally a zirconium salt, and with a dispersed or dissolved compound containing boron, wherein the step of impregnating the carrier with a dispersed or dissolved compound containing boron is effected simultaneously with the addition of noble metal and is then followed by drying and heating at 150°–650° C.

9. A process for preparation of a catalyst of claim 1 comprising steps of impregnating a carrier of a transition aluminum oxide with an aqueous solution of a cerium salt and optionally a zirconium salt, and with a dispersed or dissolved compound containing boron, wherein the step of impregnating the carrier with a dispersed or dissolved compound containing boron follows the addition of the noble metal and is then followed by drying and heating at 150°–650° C.

10. The process of claim 7, wherein the cerium and optionally zirconium compounds are introduced in the form of aqueous solutions of their oxides, hydroxides, acetates, nitrates or carbonates.

11. The process of claim 8, wherein the cerium and optionally zirconium compounds are introduced in the form of aqueous solutions of their oxides, hydroxides, acetates, nitrates or carbonates.

12. The process of claim 9, wherein the cerium and optionally zirconium compounds are introduced in the form of aqueous solutions of their oxides, hydroxides, acetates, nitrates or carbonates.

* * * * *